United States Patent
Bignon et al.

(10) Patent No.: US 9,644,525 B2
(45) Date of Patent: May 9, 2017

(54) COOLING DEVICE HAVING AIR GUIDE FOR A RADIATOR OF AN AUTOMOBILE ENGINE

(75) Inventors: Yannick Bignon, Le Plessis Robinson (FR); Michael Flandin, Broue (FR)

(73) Assignee: RENAULT s.a.s., Boulogne Billancourt (FR)

( * ) Notice: Subject to any disclaimer, the term of this patent is extended or adjusted under 35 U.S.C. 154(b) by 166 days.

(21) Appl. No.: 13/823,310

(22) PCT Filed: Nov. 14, 2011

(86) PCT No.: PCT/EP2011/070073
§ 371 (c)(1),
(2), (4) Date: Apr. 4, 2013

(87) PCT Pub. No.: WO2012/065954
PCT Pub. Date: May 24, 2012

(65) Prior Publication Data
US 2013/0220577 A1    Aug. 29, 2013

(30) Foreign Application Priority Data

Nov. 17, 2010    (FR) .................................... 10 59441

(51) Int. Cl.
*B60K 11/08*    (2006.01)
*F01P 7/02*    (2006.01)
*F01P 7/10*    (2006.01)

(52) U.S. Cl.
CPC .............. *F01P 7/02* (2013.01); *B60K 11/085* (2013.01); *F01P 7/10* (2013.01)

(58) Field of Classification Search
CPC ....... F01P 7/02; F01P 7/10; F01P 7/12; B60K 11/04; B60K 11/08; B60K 11/085

USPC ................... 165/96, 98, 202, 248; 180/68.1; 454/333, 334, 335, 336
See application file for complete search history.

(56) References Cited

U.S. PATENT DOCUMENTS

| 4,410,032 | A | * | 10/1983 | Mori | ............................... 165/98 |
| 4,966,245 | A | * | 10/1990 | Pfister | ........................ 180/68.6 |
| 6,854,544 | B2 | * | 2/2005 | Vide | ........................... 180/68.1 |
| 2009/0266312 | A1 | * | 10/2009 | Preiss | ................... B60K 11/04 |
|  |  |  |  |  | 123/41.05 |

(Continued)

FOREIGN PATENT DOCUMENTS

EP    2 248 693    11/2010

OTHER PUBLICATIONS

International Search Report Issued Feb. 3, 2012 in PCT/EP11/70073 Filed Nov. 14, 2011.

*Primary Examiner* — Len Tran
*Assistant Examiner* — Hans Weiland
(74) *Attorney, Agent, or Firm* — Oblon, McClelland, Maier & Neustadt, L.L.P.

(57) ABSTRACT

A device for cooling a radiator, including an air guide attached to structural portions of a vehicle and a device having movable air-blocking flaps, the air guide includes at least two separate portions: a front portion and a rear portion, respectively, which include a mechanism for mutual attachment, the rear portion being attached to the structural portions and including a receiving area configured to receive the device having blocking flaps, the entire assembly being held in place by an attachment mechanism of the front portion onto the rear portion.

13 Claims, 3 Drawing Sheets

(56) References Cited

U.S. PATENT DOCUMENTS

| | | | |
|---|---|---|---|
| 2010/0071977 A1* | 3/2010 | Ritz | B60K 11/085 |
| | | | 180/68.1 |
| 2010/0243351 A1* | 9/2010 | Sakai | 180/68.1 |
| 2010/0243352 A1* | 9/2010 | Watanabe et al. | 180/68.1 |
| 2010/0282533 A1 | 11/2010 | Sugiyama | |

* cited by examiner

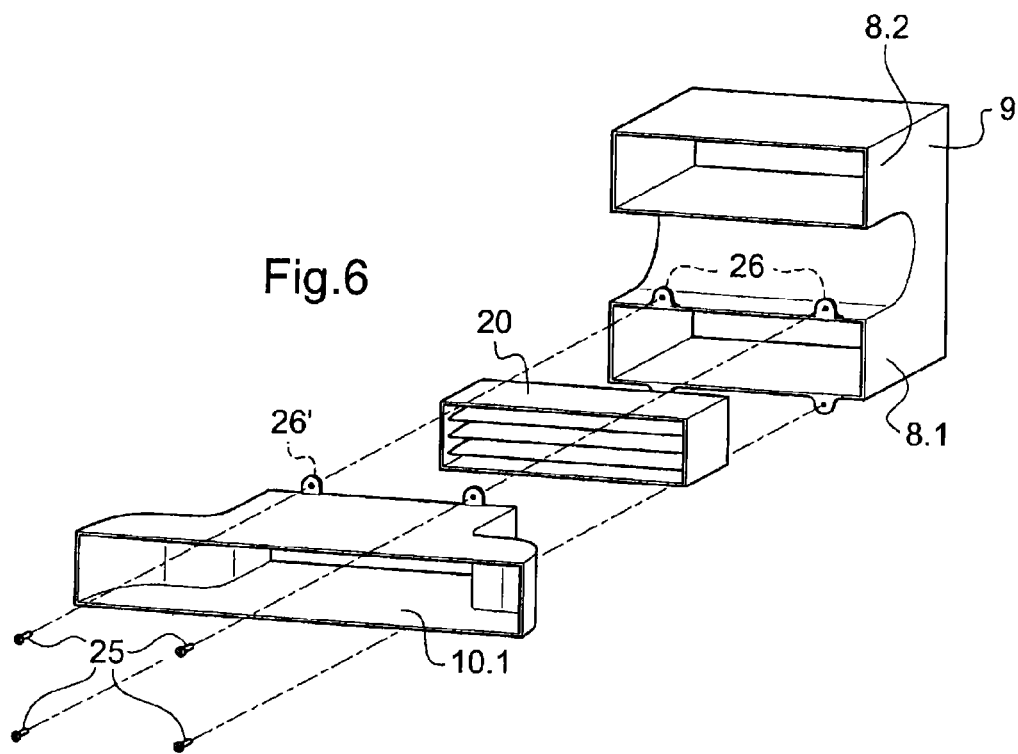
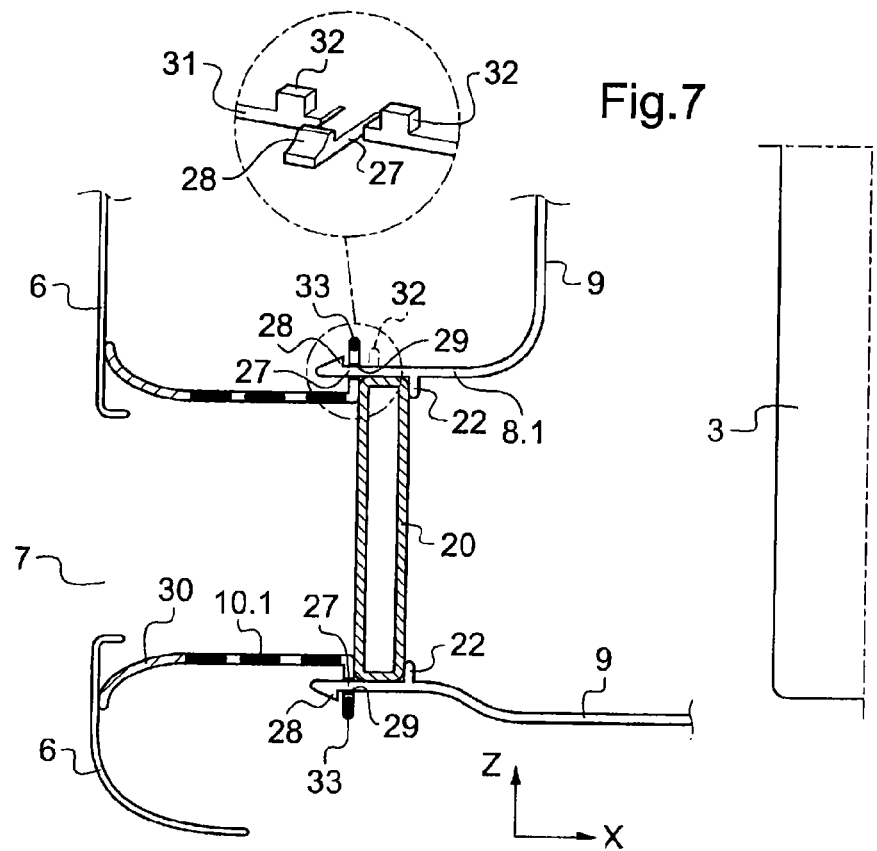

COOLING DEVICE HAVING AIR GUIDE FOR A RADIATOR OF AN AUTOMOBILE ENGINE

BACKGROUND

The present invention relates to a cooling device with an air guide for a vehicle engine radiator and notably to a device that can incorporate a shut-off device with moving flaps.

Various cooling devices comprising moving flaps, of the venetian blind type, the closure of which is controlled so as to be able to manage $CO_2$ emissions, are known. This is because it is known that letting air in over a front bumper impairs the aerodynamic drag coefficient $SC_x$ and therefore increases the $CO_2$ emissions of the vehicle. Motor manufacturers have therefore sought to position moving flaps on the air circuit, but the positioning of these moving flaps presents numerous problems in the compact environment of the front end of a vehicle where there are numerous other requirements that have to be met, notably in terms of impact protection, notably pedestrian impact. Thus, a moving flap positioned in or too close to the air intake grille is unsatisfactory: there is a risk that the flap will be damaged in the slightest impact, with high replacement costs involved in the repair. A flap borne by or incorporated into the technical front panel of the vehicle presents problems of fragility and what is more does not lend itself well to a construction that is standardized across various models given that the technical front panel is very closely tied to the design of the vehicle, made entirely of sheet metal and expensive.

Document EP 2080658 discloses a radiator cooling device intended to be mounted at the front of a motor vehicle between a radiator and a bumper skin equipped with an air inlet, of the type comprising from said air inlet as far as said radiator, an air guide fixed to structural parts of the vehicle and housing a device with flaps for shutting off the air arriving at the radiator as required. According to that document, the air guide and its shut-off means are designed to contribute in the absorption of energy in the event of an impact, which they have to do given that the shut-off means are positioned more or less at the level of the air inlet made in the bumper, with nowhere to retreat to in the event of an impact. The shut-off device is incorporated into the walls of the air guide, and the latter bears against the inside of the front bumper skin and has surfaces intended, in the event of an impact, to rest on the front and on the top of the transverse impact beam that forms part of the structure of the vehicle. This construction has the disadvantage of being specifically tied to each model of vehicle and of leaving the shut-off flaps exposed to all impacts, including low-speed impacts.

BRIEF SUMMARY

It is an object of the invention to propose an improved radiator cooling device, with an air guide construction that allows easier adaptation to suit various models of vehicle.

The invention achieves its goal through the use of a radiator cooling device intended to be mounted at the front of a motor vehicle between a radiator and a bumper skin equipped with an air inlet, of the type comprising from said air inlet as far as said radiator, an air guide fixed to structural parts of the vehicle, a device with mobile flaps for shutting off the air arriving at the radiator as required being housed as appropriate in the air guide, characterized in that the air guide comprises at least one front part and a rear part, in that said rear part is fixed to said structural parts and comprises an accepting zone designed to accept, as appropriate, said shut-off flaps device, and in that means are provided for fixing said shut-off flaps device in said rear part.

In a particularly advantageous version, the two, respectively front and rear, parts are separate and fitted with means of attaching one to another, by virtue of which it is easier to access the accepting zone in order, as appropriate, to fit the shut-off flaps device.

Advantageously, the shut-off flaps device is in the form of a removable standalone cassette that can be positioned inside the air guide or not, as desired, when the vehicle is being built, according to the cooling requirements. The cassette comprises a flaps actuator, advantageously laterally offset away from the air inlets, allowing maximum intake of air and limiting the risks of collision between the actuator and the radiator situated behind it. The rear part of the air guide therefore advantageously comprises an opening on the side through which to pass the actuator supply cable.

Advantageously, said means of attaching said shut-off flaps device into said rear part are coincident with the means of attachment of the rear part and of the front part one to the other, so that once the shut-off flaps device has been positioned in the rear part, all that is required is for the front part to be positioned and attached and the shut-off flaps device will itself become locked in position. In other words, attachment of the front and rear parts of the air guide traps the controlled-flaps cassette between the two parts via end stops.

These means of attachment may notably be by screw-fastening or by clip-fastening.

In a practical way, a bearing zone against which the shut-off flaps device can abut when the front part of the air guide is being attached to the rear part is provided in the rear part of the air guide, said front part likewise comprising a zone for bearing against the shut-off flaps device.

Advantageously, the rear part of the air guide which houses the shut-off flaps device comprises, at the front, a bearing zone for the rear of the front part, which is more or less aligned with the front face of the shut-off flaps device so that if the shut-off flaps device is not present, the position in which the front part is assembled with the rear part is substantially the same as it is when the shut-off flaps device is present. It is thus possible to use the same rear part and the same front part of air guide, whether the choice has been made to fit or not to fit the shut-off flaps device.

Advantageously, the rear part of the air guide and the shut-off flaps device are the same for several models of vehicle having a similar engine architecture, this standardization being made possible by the two-part structure of the air guide. By contrast, the front part of the air guide may be specific to each model, according to the design of the vehicle.

Advantageously, the front part of the air guide comprises sealing lips for pressing against the skin of the bumper.

Advantageously, the rear part of the air guide comprises two box sections, respectively a lower and an upper box section, opening into a manifold suited to the size of the radiator, the two sections straddling the impact beam.

Advantageously, the shut-off flaps device is positioned in the lower box section, because this is in theory the main air inlet, and substantially in vertical alignment with the impact beam, giving it good resistance to impacts, notably front end impacts at under 16 km/h (Danner impacts).

Advantageously, the rear part of the air guide is fixed to the transverse impact beam and/or to the lower part of the bumper.

The invention makes it possible to improve the $CO_2$ emissions of a vehicle by using an optional mobile-flaps module that can be incorporated into an existing architecture, using a solution that is economical insofar as the rear part of the air guide and the flaps cassette are standardized. The cassette is optional and it is possible for vehicles intended to be marketed in countries where the regulations do not set a tax on $CO_2$ emissions not to be fitted with it: however, in such a case, the air guide is used with its front and rear parts, simply plugging the lateral control cable outlet hole; the overall fluidtightness of the air guide according to the invention is improved in relation to conventional vehicles without controlled flaps.

Moreover, because the mobile flaps module is prepared at the preparation workshop, installing it does not make any appreciable difference to the production time on the main assembly line.

BRIEF DESCRIPTION OF THE DRAWINGS

Other features and advantages of the invention will become apparent from the following description of a number of exemplary embodiments. Reference will be made to the attached drawings in which:

FIG. 6 shows an exploded view of one particular embodiment of how the mobile flaps cassette is installed in the air guide, FIG. 7 is a cross section of another particular embodiment of how the mobile flaps cassette is installed in the air guide.

DETAILED DESCRIPTION

Figure 1:
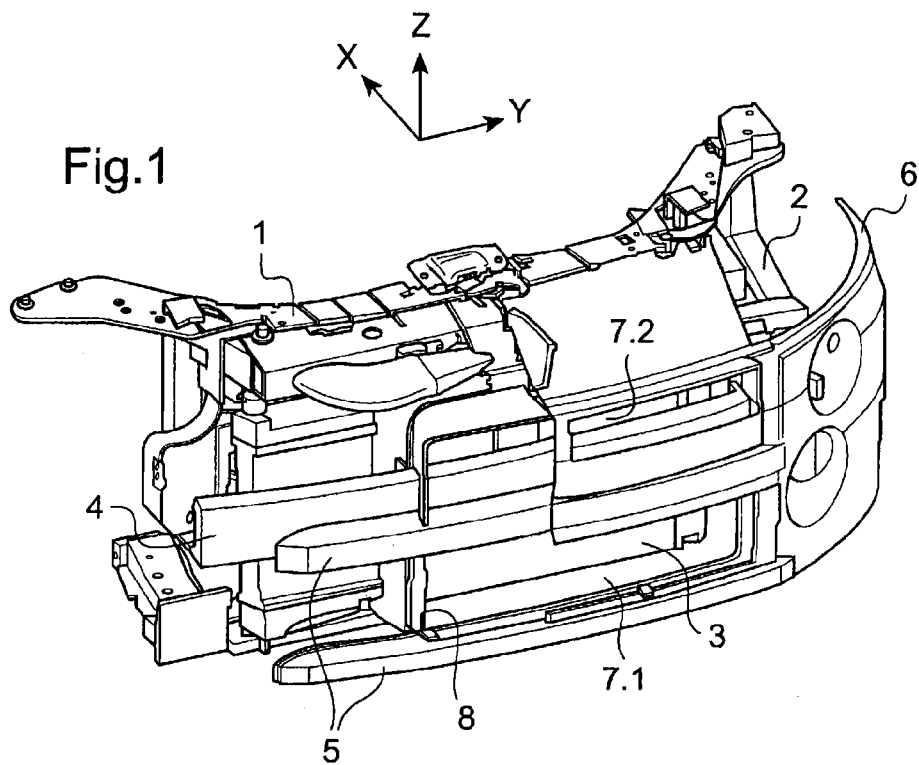
FIG. 1 is a cut-away perspective view of the front of a vehicle in which the invention can be fitted.

FIG. 1 illustrates the front of the engine compartment at the front of a vehicle of a conventional type to which the invention may be applied. From the rear forward, there are:

The technical front end 1 which acts as a vertical support for a certain number of components and is fixed securely to structural elements of the chassis, for example to components connected to the chassis frame side rails 2.

The vertical radiator 3, fixed with overhang on the technical front end 1.

The transverse impact beam 4 which is connected in a way that has not been depicted to structural elements of the chassis, theoretically to the front of the chassis frame side rails 2. The impact beam cuts across the space in front of the radiator 3.

The shock absorber 5 of the bumper 6, here in the form of two, lower and upper, transverse section pieces. The upper section piece here is situated in front of the impact beam 4. The bumper 6 comprises, in the usual way, a front face, wrap-around ends and a lower spoiler part which continues rearward under the front of the vehicle.

In the bumper 6, an opening (at least), and in this instance two openings 7.1 and 7.2, allow cooling air to enter, which air is then directed toward the radiator 3 by a suitable air guide 8. In practice, the inlet 7.1 may be the main inlet and the inlet 7.2 may or may not be used.

As can be seen clearly in FIGS. 2, 3 and 5, because of the presence of the impact beam 4, the air guide 8 is advantageously, in the vicinity of said beam, in the form of a U-shaped box section straddling the beam and having a lower passage part in the form of a box section 8.1 and an upper passage part in the form of a box section 8.2 these lying respectively below and above the beam 4 and both opening downstream into a common manifold 9 suited to the surface area of the radiator 3 in front of which it is positioned with suitable sealing contrivances. These box sections 8.1, 8.2 and the manifold 9 form the rear part of the air guide of the invention, which is supplemented upstream by a front air guide intended to contain the air in a substantially fluidtight manner between the air inlets 7.1 and 7.2 and the rear part 8.1, 8.2, 9, for example in the form of box sections 10.1 and 10.2, provided with a suitable seal toward the front (cf. FIGS. 2 and 3).

Figure 2:
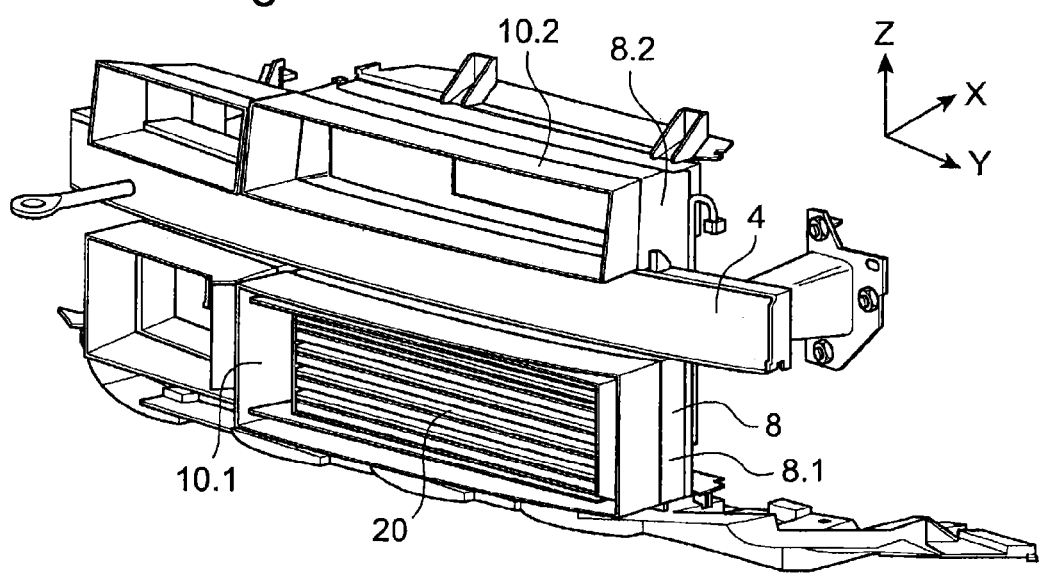
FIG. 2 is a perspective view of the rear air guide according to the invention and of the mobile flaps cassette it houses in its lower part.
Figure 3:
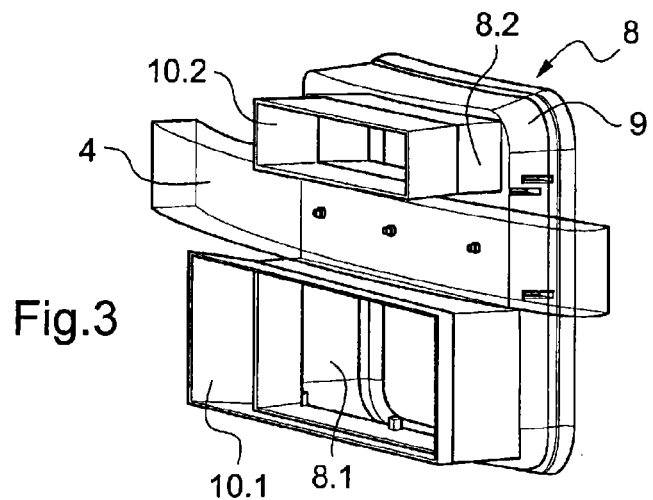
FIGS. 3 and 4 are perspective views of the rear air guide and of the cassette of FIG. 2, respectively.
Figure 4:
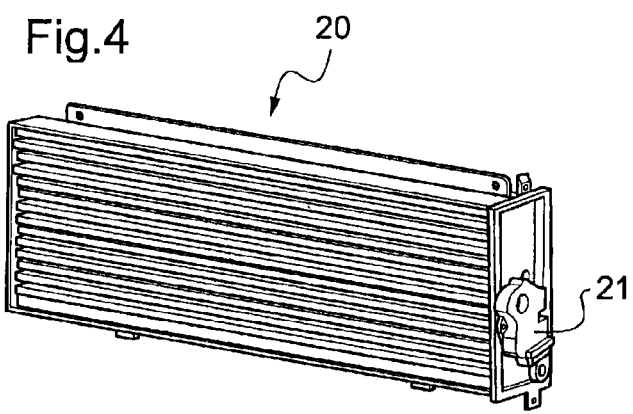
Figure 5:
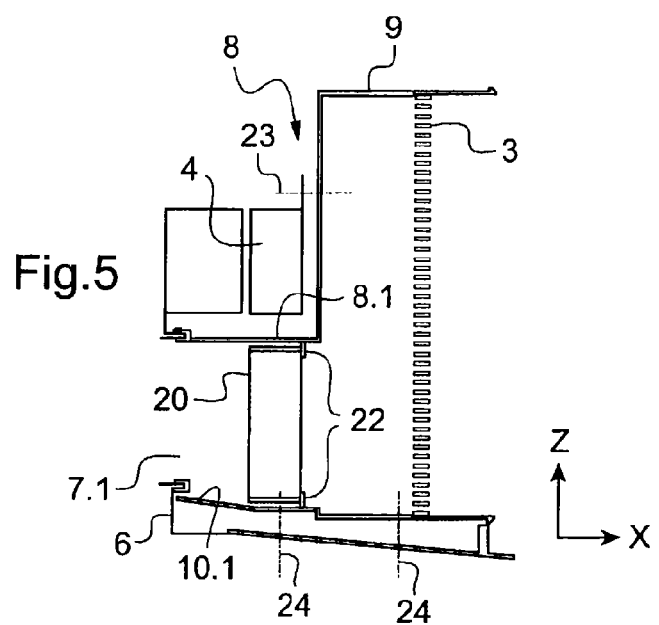
FIG. 5 is a schematic view in longitudinal vertical section of an alternative form of embodiment of the device according to the invention.

According to the invention, the air guide 8, particularly the lower part 8.1 thereof, which corresponds to the main air inlet 7.1, may, thanks to suitable positioning and immobilizing means, house a cassette 20 of mobile shut-off flaps which are controlled by a lateral control device 21 (FIGS. 2, 4 and 5). Such a cassette may be in the form of a rectangle as can be seen in FIG. 4. It is also possible to provide another cassette in the upper part 8.2 but the lower flow rate passing through that does not necessarily justify such an approach. The lateral control device 21 is supplied by a cable, not depicted, passing through a lateral opening, likewise not depicted in the lower box section 8.1 of the air guide.

FIG. 5 schematically depicts a slightly different embodiment again showing the beam 4 and the lower box section 8.1 situated under the beam and opening into a manifold 9 of the size of the radiator 3. In this solution, the upper box section has simply been omitted. The mobile flaps cassette 20 is housed in the single lower box section 8.1 against a peripheral end stop 22 sealed against air. Lines 23, 24 indicate the potential regions at which the air guide can be attached to the beam 4 (lines 23) and/or, in the lower part, to the spoiler of the bumper 6 (lines 24).

FIG. 6 shows the rear part of a preferred embodiment of air guide of the invention, intended to straddle the impact beam, not depicted, and made up of an upper and a lower box section 8.1 and 8.2 and of the rear manifold 9. This assembly may be of a single piece or as several assembled pieces. As has been seen, the box section 8.1 accommodates the cassette 20 the shape of which is designed to fit exactly into said box section and press against a continuous peripheral end stop arranged on the internal surface of the box section 8.1, all of this being so as to achieve airtightness simply by pressing. The cassette 20 is held in position, more or less in vertical alignment with the impact beam, by closing the assembly using the front part 10.1 of the air guide which is attached to the assembly by four self-tapping fixing screws 25 which go through lugs 26' on the front part 10.1 and screw into barrels 26 made of soft material formed on the exterior surface near four corners of the peripheral internal end stop of the box section 8.1. This attachment keeps the front guide 10.1, the cassette 20 and the rear guide 8.1 all pressed against one another in an airtight manner. According to the invention, the rear part of the air guide 8.1, 8.2, 9 is intended to be the same for all engines of the same range of vehicles and, as required, will either house or not house a mobile flaps cassette 20. The front part 10.1 on the other hand is a component specific to each model of car because it is dependent on the design of said car.

FIG. 7 shows a solution using clip-fastening rather than screw-fastening. Again, it shows the rear part of the air guide

8.1, 9 facing the radiator 3, with the cassette 20 pressed in an airtight manner against the internal end stop 22. The front part of the box section 8.1 on its edge 31 comprises flexible snap-fixing tabs 27 with hooks 28 pointing forward and able to clip into openings 29 provided on a transverse rim 33 formed at the rear of the front component 10.1. The edge 31 also comprises, on each side, end stops 32 intended to block the rearward movement of the transverse rim 33 of the front component 10.1 of the air guide so that this component will maintain substantially the same position along the X axis regardless as to whether or not the cassette 20 is present. What is more, the component 10.1 comprises, at the front, a flexible lip 30 intended to press against the inside of the skin of the bumper 6, around the air inlet opening 7. Once again, the front part 10.1 is a component specific to each model of car, whereas the rear part is a part that is common to an entire range of models having the same engine architecture.

The invention claimed is:

1. A radiator cooling device configured to be mounted at a front of a motor vehicle between a radiator and a bumper skin, comprising:
    an air inlet;
    an air guide fixed to structural parts of the vehicle, from the air inlet as far as the radiator, the air guide comprising at least one front part and a rear part;
    a shut-off flaps device including mobile flaps for shutting off air arriving at the radiator as required and housed in the air guide; and
    means for fixing the shut-off flaps device in the rear part,
    wherein the bumper skin is in front of and separate from an impact beam,
    wherein the front part of the air guide presses against an inner surface of the bumper skin,
    wherein the rear part is fixed to the impact beam and comprises an accepting zone configured to accept the shut-off flaps device,
    wherein the front part and rear part are separate, the front part is fixed to the rear part and the front part secures the shut-off flaps device into the rear part,
    wherein the front part, the shut-off flaps device within the rear part, and the rear part are pressed against one another in an airtight manner, and
    wherein the rear part of the air guide which houses the shut-off flaps device comprises, at a front portion of the rear part, a first bearing zone for a rear portion of the front part, which is substantially aligned with a front face of the shut-off flaps device so that if the shut-off flaps device is not present, a position in which the front part is assembled with the rear part is substantially the same as when the shut-off flaps device is present.

2. The device as claimed in claim 1, wherein the shut-off flaps device is in a form of a removable standalone cassette that can be positioned inside the air guide or not, as desired.

3. The device as claimed in claim 1, wherein the rear part of the air guide includes a second bearing zone against which the shut-off flaps device can abut when the front part of the air guide is being attached to the rear part of the air guide, the front part also comprising a zone for bearing against the shut-off flaps device.

4. The device as claimed in claim 1, wherein the front part of the air guide comprises sealing lips for pressing against the bumper skin.

5. The device as claimed in claim 1, wherein the rear part of the air guide comprises two box sections, respectively a lower and an upper box section, opening into a manifold configured to a size of the radiator, the two box sections straddling the impact beam.

6. The device as claimed in claim 5, wherein the shut-off flaps device is positioned in the lower box section.

7. The device as claimed in claim 1, wherein the means for fixing the shut-off flaps device in the rear part includes self-tapping fixing screws.

8. The device as claimed in claim 1, wherein the front part is fixed to the rear part by clip fastening.

9. The device as claimed in claim 8, wherein a front portion of the rear part includes flexible snap-fixing tabs with hooks that clip into openings provided on a transverse rim formed at a rear portion of the front part.

10. A radiator cooling device configured to be mounted at a front of a motor vehicle between a radiator and a bumper skin, comprising:
    an air inlet;
    an air guide fixed to structural parts of the vehicle, from the air inlet as far as the radiator; and
    a shut-off flaps device including mobile flaps for shutting off air arriving at the radiator as required and housed in the air guide;
    wherein the bumper skin is in front of and separate from an impact beam,
    wherein the air guide comprises at least one front part and a rear part,
    wherein the front part of the air guide presses against an inner surface of the bumper skin,
    wherein the rear part is fixed to an impact beam and comprises an accepting zone configured to accept-the shut-off flaps device,
    wherein the front part and rear part are separate, the front part is fixed to the rear part and the front part secures the shut-off flaps device into the rear part,
    wherein the front part, the shut-off flaps device within the rear part, and the rear part are pressed against one another in an airtight manner, and
    wherein the rear part of the air guide which houses the shut-off flaps device comprises, at a front portion of the rear part, a first bearing zone for a rear portion of the front part, which is substantially aligned with a front face of the shut-off flaps device so that if the shut-off flaps device is not present, a position in which the front part is assembled with the rear part is substantially the same as when the shut-off flaps device is present.

11. The device as claimed in claim 1, wherein the first bearing zone of the rear part of the air guide includes an end stop on an exterior of the rear part of the air guide.

12. The device as claimed in claim 3, wherein the second bearing zone of the rear part of the air guide includes an end stop on an interior of the rear part of the air guide.

13. The device as claimed in claim 10, wherein the shut-off flaps device is attached to the rear part by self-tapping fixing screws.

* * * * *